United States Patent
Dods

(10) Patent No.: US 10,735,469 B1
(45) Date of Patent: Aug. 4, 2020

(54) APPARATUS, SYSTEM, AND METHOD FOR PREDICTIVELY ENFORCING SECURITY POLICIES ON UNKNOWN FLOWS

(71) Applicant: Juniper Networks, Inc., Sunnyvale, CA (US)

(72) Inventor: Craig Dods, Stittsville (CA)

(73) Assignee: Juniper Networks, Inc, Sunnyvale, CA (US)

( * ) Notice: Subject to any disclaimer, the term of this patent is extended or adjusted under 35 U.S.C. 154(b) by 158 days.

(21) Appl. No.: 15/640,495

(22) Filed: Jul. 1, 2017

(51) Int. Cl.
*G06F 17/00* (2019.01)
*H04L 29/06* (2006.01)
*H04L 12/26* (2006.01)

(52) U.S. Cl.
CPC ............ *H04L 63/20* (2013.01); *H04L 43/028* (2013.01); *H04L 63/0254* (2013.01); *H04L 63/1433* (2013.01); *H04L 63/1441* (2013.01)

(58) Field of Classification Search
CPC . H04L 63/20; H04L 63/0254; H04L 63/1433; H04L 63/1441; H04L 43/028
See application file for complete search history.

(56) References Cited

U.S. PATENT DOCUMENTS

| | | | |
|---|---|---|---|
| 7,540,025 B2 * | 5/2009 | Tzadikario | H04L 63/0227 726/22 |
| 7,813,944 B1 * | 10/2010 | Luk | G06Q 40/08 705/2 |
| 8,339,959 B1 | 12/2012 | Moisand et al. | |
| 8,363,654 B2 | 1/2013 | Congdon | |
| 9,614,773 B1 * | 4/2017 | Tagore | H04L 47/2441 |
| 10,122,735 B1 * | 11/2018 | Wohlgemuth | H04L 63/0236 |
| 10,291,748 B1 * | 5/2019 | Dods | H04L 63/166 |
| 2004/0015719 A1 * | 1/2004 | Lee | H04L 63/0227 726/23 |
| 2005/0027837 A1 * | 2/2005 | Roese | H04L 41/0893 709/223 |
| 2007/0195788 A1 * | 8/2007 | Vasamsetti | H04W 28/24 370/395.21 |
| 2008/0162929 A1 | 7/2008 | Ishikawa et al. | |

(Continued)

OTHER PUBLICATIONS

Craig Dods; Apparatus, System, and Method for Predictively Forwarding Unknown Flows; U.S. Appl. No. 15/335,384, filed Oct. 26, 2016.

*Primary Examiner* — Samson B Lemma
*Assistant Examiner* — Darshan I Dhruv
(74) *Attorney, Agent, or Firm* — FisherBroyles, LLP

(57) ABSTRACT

The disclosed apparatus may include a storage device that stores a set of security policies. In this example, the apparatus may also include a physical processor that is communicatively coupled to the storage device. This physical processor may (1) analyze an unknown flow of packets that are destined for a target node within the network, (2) identify at least one characteristic of the unknown flow of packets based at least in part on the analysis, (3) predictively select, from the set of security policies stored in the storage device, a security policy to apply to the unknown flow of packets based at least in part on the characteristic of the unknown flow of packets, and then (4) perform at least one security action defined by the predictively selected security policy on the unknown flow of packets. Various other apparatuses, systems, and methods are also disclosed.

15 Claims, 5 Drawing Sheets

(56) References Cited

U.S. PATENT DOCUMENTS

| | | | | |
|---|---|---|---|---|
| 2008/0244693 | A1* | 10/2008 | Chang | G06F 21/554 |
| | | | | 726/1 |
| 2008/0289040 | A1* | 11/2008 | Ithal | H04L 63/1416 |
| | | | | 726/23 |
| 2009/0222877 | A1* | 9/2009 | Diehl | H04L 63/0263 |
| | | | | 726/1 |
| 2010/0095367 | A1* | 4/2010 | Narayanaswamy | H04L 63/20 |
| | | | | 726/12 |
| 2010/0118885 | A1* | 5/2010 | Congdon | H04L 49/254 |
| | | | | 370/419 |
| 2010/0192225 | A1* | 7/2010 | Ma | H04L 63/0227 |
| | | | | 726/23 |
| 2010/0281539 | A1* | 11/2010 | Burns | H04L 63/1441 |
| | | | | 726/23 |
| 2011/0196821 | A1* | 8/2011 | Hellerman | G06F 16/958 |
| | | | | 707/600 |
| 2013/0246377 | A1* | 9/2013 | Gaitonde | H04L 63/0236 |
| | | | | 707/697 |
| 2014/0254379 | A1* | 9/2014 | Sampath | H04N 21/643 |
| | | | | 370/235 |
| 2015/0023207 | A1* | 1/2015 | Lan | H04L 45/308 |
| | | | | 370/254 |
| 2015/0055657 | A1* | 2/2015 | Zuk | H04L 45/38 |
| | | | | 370/392 |

* cited by examiner

US 10,735,469 B1

APPARATUS, SYSTEM, AND METHOD FOR PREDICTIVELY ENFORCING SECURITY POLICIES ON UNKNOWN FLOWS

BACKGROUND

Networks often include nodes that forward traffic to one another. For example, a network may include a node that establishes a communication session (such as a Transport Control Protocol (TCP) session) with another node. In this example, the node may send traffic via the communication session across the network toward the other node. The traffic may arrive at a firewall responsible for protecting the other node against potential security threats. Upon receiving the traffic, the firewall may perform some type of security inspection to determine whether the traffic poses a threat to the other node.

In one example, the security inspection performed on the traffic may involve comparing the traffic against a set of Intrusion Prevention System (IPS) signatures. Unfortunately, in the event that this set consists of a large number of IPS signatures, the security inspection may take a significant amount of time and/or consume a significant amount of computing resources, thereby potentially impairing the firewall's performance and/or the communication session's performance.

On the one hand, such a security inspection may prove to be worthwhile when performed on suspicious and/or harmful traffic. However, on the other hand, such a security inspection may prove to be overkill and/or an unnecessary use of time and/or computing resources when performed on unsuspicious and/or benign traffic.

SUMMARY

As will be described in greater detail below, the instant disclosure generally relates to apparatuses, systems, and methods for predictively enforcing security policies on unknown flows. In one example, an apparatus for accomplishing such a task may include a storage device that stores a set of security policies that define which security actions to perform on flows of packets encountered within a network. In this example, the apparatus may also include a physical processor that is communicatively coupled to the storage device. This physical processor may (1) analyze an unknown flow of packets that are destined for a target node within the network, (2) identify at least one characteristic of the unknown flow of packets based at least in part on the analysis, (3) predictively select, from the set of security policies stored in the storage device, a security policy to apply to the unknown flow of packets based at least in part on the characteristic of the unknown flow of packets, and then (4) perform at least one security action defined by the predictively selected security policy on the unknown flow of packets.

Similarly, a network device incorporating the above-described apparatus may include a storage device that stores a set of security policies that define which security actions to perform on flows of packets encountered within a network. In this example, the network device may also include a physical processor that is communicatively coupled to the storage device. This physical processor may (1) analyze an unknown flow of packets that are destined for a target node within the network, (2) identify at least one characteristic of the unknown flow of packets based at least in part on the analysis, (3) predictively select, from the set of security policies stored in the storage device, a security policy to apply to the unknown flow of packets based at least in part on the characteristic of the unknown flow of packets, and then (4) perform at least one security action defined by the predictively selected security policy on the unknown flow of packets.

A corresponding method may include (1) analyzing an unknown flow of packets that are destined for a target node within a network, (2) identifying at least one characteristic of the unknown flow of packets based at least in part on the analysis, (3) identifying a set of security policies that define which security actions to perform on flows of packets encountered within the network, (4) predictively selecting, from the set of security policies, a security policy to apply to the unknown flow of packets based at least in part on the characteristic of the unknown flow of packets, and then (5) performing at least one security action defined by the predictively selected security policy on the unknown flow of packets.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
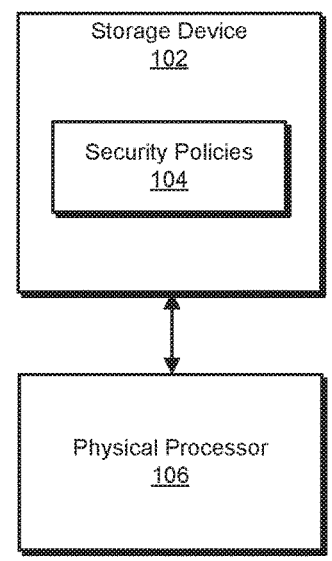
FIG. 1 is a block diagram of an exemplary apparatus for predictively enforcing security policies on unknown flows.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for predictively enforcing security policies on unknown flows. As will be explained in greater detail below, embodiments of the instant disclosure may enable network devices (such as firewalls) to predictively select and/or enforce security policies in connection with unknown flows encountered within a network. For example, a firewall may analyze an unknown flow of packets that are destined for a target node within the network. The firewall may identify certain characteristics of the unknown flow based at least in part on the analysis. The firewall may select and/or devise a security policy based at least in part on the characteristics of the unknown flow and then apply the security policy to the unknown flow.

In some examples, the security policy may define certain actions to perform on the unknown flow. For example, the security policy may identify, include, and/or otherwise implicate a certain number of security signatures (such as IPS signatures). Upon selection and/or creation of the security policy, the firewall may apply and/or enforce the security policy on the unknown flow by comparing the unknown flow against the security signatures identified by, included in, and/or otherwise implicated by the security policy selected and/or created for the unknown flow.

In one example, the number of security signatures identified by, included in, and/or otherwise implicated by the security policy may be far less than the total number of security signatures available to the firewall. For example, the firewall may include and/or have access to a collection of approximately 13,000 unique IPS signatures. In this example, however, the security policy may identify, include, and/or implicate approximately 300 unique IPS signatures. These 300 unique IPS signatures may represent those IPS signatures that are most relevant and/or determinative to detecting any potential threats posed by the unknown flow.

As a result, by comparing the unknown flow against the 300 IPS signatures implicated by the security policy rather than against the entire collection of 13,000 IPS signatures, the firewall may be able to reduce the amount of time taken and/or the amount of computing resources consumed as part of a security inspection performed on the unknown flow prior to forwarding the unknown flow toward its destination. Accordingly, embodiments of the instant disclosure may improve the firewall's performance and/or efficiency. Additionally or alternatively, embodiments of the instant disclosure may improve the performance and/or speed of the unknown flow handled by the firewall.

The term "flow," as used herein, generally refers to any communication session that includes, involves, and/or facilitates the exchange of traffic between computing devices. The term "unknown flow," as used herein, generally refers to a first instance of a specific flow relative to a computing device responsible for forwarding and/or facilitating the exchange of traffic between computing devices in a communication session. In some examples, an unknown flow may occur and/or represent the first time that one node attempts to establish a communication session with another node in connection with a specific application and/or in a certain environmental context.

Figure 2:
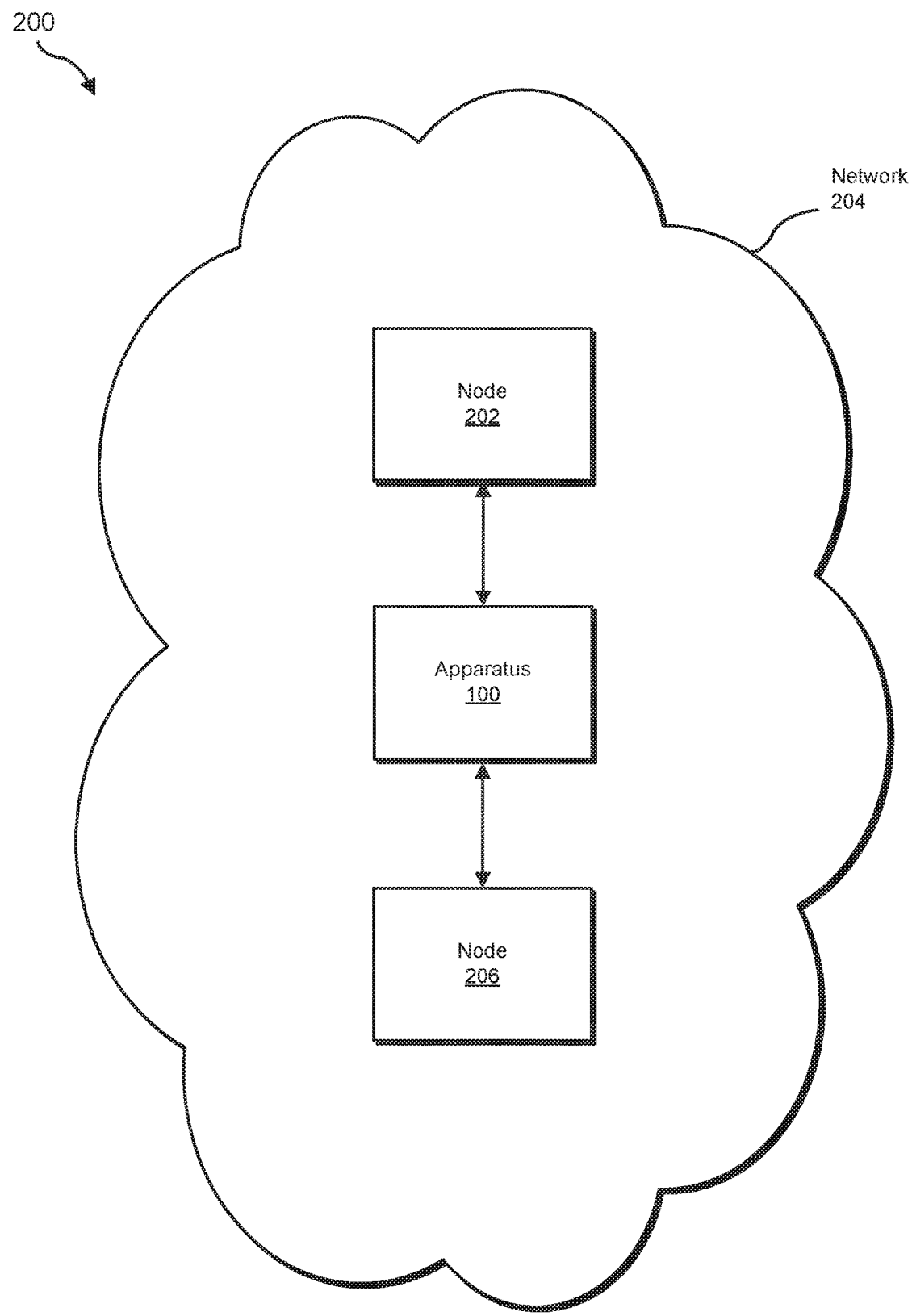
FIG. 2 is a block diagram of an exemplary implementation of an apparatus for predictively enforcing security policies on unknown flows.

The following will provide, with reference to FIGS. 1-2, examples of apparatuses and corresponding implementations that facilitate predictively enforcing security policies on unknown flows. The discussion corresponding to FIG. 3 will provide a detailed description of an exemplary collection of security signatures and an exemplary subset of security signatures. The discussion corresponding to FIG. 4 will provide a detailed description of an exemplary method for predictively enforcing security policies on unknown flows. Finally, the discussion corresponding to FIG. 5 will provide numerous examples of systems that may include the components shown in FIGS. 1, 2, and 3.

FIG. 1 shows an exemplary apparatus 100 for predictively enforcing security policies on unknown flows. In one example, apparatus 100 may include and/or represent a physical firewall device. Additional examples of apparatus 100 include, without limitation, network devices, routers, switches, hubs, modems, bridges, repeaters, gateways, load balancers, multiplexers, network adapters, servers, client devices, portions of one or more of the same, variations or combinations of one or more of the same, and/or any other suitable apparatus.

As illustrated in FIG. 1, apparatus 100 may include a storage device 102 and a physical processor 106. Storage device 102 generally represents any type or form of volatile or non-volatile memory or storage medium capable of storing data and/or computer-readable instructions. In one example, storage device 102 may store, load, and/or maintain security policies 104. Examples of storage device 102 include, without limitation, Random Access Memory (RAM), Read Only Memory (ROM), flash memory, Hard Disc Drives (HDDs), Solid-State Drives (SSD), optical disk drives, caches, variations or combinations of one or more of the same, and/or any other suitable storage device.

Security policies 104 each generally represent any type or form of profile and/or set of rules that indicates how to inspect and/or handle flows of packets that meet certain criteria. Examples of security policies 104 include, without limitations, IPS policies, IDS policies, sandbox policies, application firewall policies, combinations or variations of one or more of the same, and/or any other suitable security policies.

In some examples, a security policy may identify which security inspections and/or procedures to perform on certain flows of packets. For example, a security policy may indicate that an unknown flow that satisfies certain criteria is to undergo an Intrusion Detection System (IDS) inspection, an IPS inspection, a sandbox test, and/or an application firewall examination. Alternatively, a security policy may indicate that an unknown flow that satisfies certain criteria is to be forwarded with very little, if any, security inspection and/or verification. In other words, the security policy may direct apparatus 100 to simply pass the unknown flow toward its destination without performing much, if any, security inspection on the unknown flow.

In some examples, a security policy may identify various security signatures that are potentially relevant to detecting threats posed by certain flows of packets. In other words, when the unknown flow is compared against the security signatures identified by the security policy, the comparison may result in a match indicating that the unknown flow represents a potentially security threat.

In some examples, a security policy may identify how to handle certain flows of packets that are classified as potential security threats. In other words, the security policy may call for and/or define specific security actions to be performed on any potentially threatening flows of packets. For example, the security policy may indicate that any potentially threatening flow is to be blocked, dropped, rerouted, and/or quarantined. Additionally or alternatively, the security policy may indicate that the destination of any potentially threatening flow is to be notified about the threat and/or about the flow having been blocked, dropped, rerouted, and/or quarantined.

Physical processor 106 generally represents any type or form of hardware-implemented processor capable of interpreting and/or executing computer-readable instructions. In one example, physical processor 106 may access, add, remove, create, and/or modify security policies 104 stored in storage device 102. Examples of physical processor 106 include, without limitation, physical processors, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Apparatus 100 in FIG. 1 may be implemented in a variety of ways and/or contexts. As a specific example, FIG. 2 shows a block diagram of an exemplary implementation 200 that includes apparatus 100 for predictively enforcing security policies on unknown flows. As illustrated in FIG. 2, implementation 200 may include a network 204 that consists of multiple computing devices. For example, network 204 may include and/or represent a node 202, a node 206, and/or apparatus 100. In this example, nodes 202 and 206 may be able to exchange communications with one another via apparatus 100. Network 204 may include other network devices (not necessarily illustrated in FIG. 2) that sit between nodes 202 and 206 and/or are included in the path that links node 202 with node 206.

Nodes 202 and 206 each generally represent any type or form of computing device capable of reading computer-executable instructions. In one example, nodes 202 and 206 may each include and/or represent a physical network device (such as a router, switch, and/or gateway). Additional examples of nodes 202 and 206 include, without limitation, client devices, computing devices, servers, laptops, tablets, desktops, storage devices, cellular phones, Personal Digital Assistants (PDAs), multimedia players, embedded systems, wearable devices (e.g., smart watches, smart glasses, etc.), gaming consoles, variations or combinations of one or more of the same, and/or any other suitable nodes.

Network 204 generally represents any medium or architecture capable of facilitating communication or data transfer. In one example, network 204 may facilitate communication between nodes 202 and 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although not necessarily illustrated in this way in FIG. 2, network 204 may also include and/or represent various other computing devices in addition to nodes 202 and 206 and apparatus 100.

In some examples, apparatus 100 may monitor traffic traversing network 204 over a certain period of time. As part of this monitoring, apparatus 100 may collect information about the traffic. In this example, apparatus 100 may build and/or generate a security reference based at least in part on the information collected about the traffic.

In one example, the security reference may take into account whether certain flows were eventually classified as benign, harmful, trusted, untrusted, known, and/or unknown. Accordingly, the security reference may represent a historical depiction, baseline, and/or account of the traffic that has passed through apparatus 100. As will be explained in greater detail below, this security reference may provide comparative insight into the nature and/or trustworthiness of unknown flows of packets encountered by apparatus 100 at a later point in time.

After the security reference has been built and/or generated, apparatus 100 may encounter an unknown flow of packets that are destined for a certain node within a network. For example, node 202 may initiate an unknown flow of packets and then send the same to apparatus 100. In this example, apparatus 100 may receive the unknown flow of packets from node 202. The unknown flow of packets may be destined for node 206.

In one example, apparatus 100 may identify and/or analyze the unknown flow of packets. For example, apparatus 100 may perform Deep Packet Inspection (DPI) on the first 50 packets of the unknown flow. As part of this DPI, apparatus 100 may identify and/or examine a Secure Sockets Layer (SSL) header of at least one of the packets of the unknown flow. Additionally or alternatively, apparatus 100 may export certain results of the DPI to storage device 102 or another computing device for future reference, correlation, and/or use in connection with predictively selecting and/or enforcing security policies.

In one example, apparatus 100 may identify certain characteristics of the unknown flow of packets based at least in part on the analysis. For example, apparatus 100 may identify node 202 as the source of the unknown flow of packets, the name of the user operating node 202, a timestamp included in the unknown flow of packets, the Internet Protocol (IP) address of the source node, and/or the IP address of the destination node.

Examples of such characteristics of the unknown flow include, without limitation, the identity of the user who initiated the unknown flow of packets, the history of the user's computing behavior, the identity of the source node on which the user initiated the unknown flow of packets, the history of the source node's computing activity, the time of day that the unknown flow of packets was initiated at the source node, the IP address of the target node for which the unknown flow of packets are destined, the type of browser used to initiate the unknown flow of packets, the type of device of the source node, the application used by the browser to initiate the unknown flow of packets, the operating system running on the node that initiated the unknown flow of packets, variations or combinations of one or more of the same, and/or any other suitable characteristics.

In one example, apparatus 100 may predictively select and/or create a specific security policy to apply to the unknown flow of packets based at least in part on the characteristics of the unknown flow. This security policy may be included in and/or added to security polices 104. For example, apparatus 100 may compare the characteristics of the unknown flow of packets to the security reference built from the collected information about the traffic traversing network 204.

In one example, apparatus 100 may determine that the unknown flow of packets presents a low level of risk to the target node. In response to this determination, apparatus 100 may predictively select a low-security policy to apply to the flow of packets. This low-security policy may be less restrictive and/or more efficient than a medium-security policy and/or a high-security policy.

In another example, apparatus 100 may determine that the unknown flow of packets presents a moderate level of risk to the target node. In response to this determination, apparatus 100 may predictively select a medium-security policy to apply to the flow of packets. This medium-security policy may be less restrictive and/or more efficient than a high-security policy but more restrictive and/or less efficient than a low-security policy.

In a further example, apparatus 100 may determine that the unknown flow of packets presents a high level of risk to the target node. In response to this determination, apparatus 100 may predictively select a high-security policy to apply to the flow of packets. This high-security policy may be more restrictive and/or less efficient than a low-security policy and/or a medium-security policy.

Various algorithms and/or computing techniques may be applied and/or used to predictively select the security policy for the unknown flow of packets. In one example, apparatus 100 may apply and/or implement machine learning, fuzzy learning, and/or neural networks on the security reference and/or collected information about the traffic traversing the network. Additionally or alternatively, apparatus 100 may apply and/or implement machine learning, fuzzy learning, and/or neural networks in the process of selecting and/or creating the security policy.

Upon selecting and/or creating the security policy, apparatus 100 may apply and/or enforce the security policy on the unknown flow of packets. For example, as part of the security policy, apparatus 100 may perform one or more security actions on the unknown flow of packets. Such security actions include, without limitation, blocking or dropping the unknown flow of packets, rerouting the unknown flow of packets, quarantining the unknown flow of packets, notifying the source or target node that the unknown flow of packets has been blocked or dropped, combinations or variations of one or more of the same, and/or any other suitable security actions.

As a specific example, apparatus 100 may monitor traffic that originates from node 202 over the course of one month. During this time, apparatus 100 may identify, document, and/or record daily instances in which node 202 sends traffic to node 206 between 12:00 PM and 12:15 PM. In this example, node 206 may include and/or represent a FACEBOOK server that facilitates access to users' accounts, friends, and/or feeds. In addition, node 202 may include and/or represent an APPLE MACBOOK computer running a MACINTOSH operating system.

Accordingly, apparatus 100 may note and/or determine that the user operating node 202 visits and/or opens FACEBOOK every day at or around this time via an APPLE SAFARI browser. As a result, apparatus 100 may build and/or generate a security reference indicating an expectation of receiving FACEBOOK traffic from node 202 at or around this time. Since, in this example, FACEBOOK traffic is likely harmless, the security reference may direct apparatus 100 to apply and/or enforce a low-security policy on unknown flows received from node 202 between 12:00 PM and 12:15 PM. This low-security policy may include only IPS signatures that are specific to FACEBOOK traffic, the MACINTOSH operating system, and/or the APPLE SAFARI browser.

Continuing with this example, apparatus 100 may receive an unknown flow of packets at 12:05 PM on 12 Jun. 2017. Upon receiving this unknown flow, apparatus 100 may analyze the unknown flow using DPI. This analysis may indicate that the unknown flow originated from node 202. Since, in this example, the unknown flow originated from node 202 between 12:00 PM and 12:15 PM, apparatus 100 may apply and/or enforce the security policy that includes only IPS signatures specific to FACEBOOK traffic, the MACINTOSH operating system, and/or the APPLE SAFARI browser.

The relevant IPS signatures may represent a small subset of the total number of IPS signatures available to apparatus 100. For example, apparatus 100 may include and/or have access to 13,000 unique IPS signatures. In this example, however, only 300 of those 13,000 unique IPS signatures may be relevant and/or specific to FACEBOOK traffic, the MACINTOSH operating system, and/or the APPLE SAFARI browser.

Accordingly, apparatus 100 may compare the unknown flow of packets against the 300 IPS signatures that are specific to FACEBOOK traffic, the MACINTOSH operating system, and/or the APPLE SAFARI browser. Apparatus 100 may also avoid comparing the unknown flow of packets against the other 12,700 IPS signatures. In other words, apparatus 100 may omit the irrelevant 12,700 IPS signatures from the security inspection performed on the unknown flow of packets. By omitting these irrelevant 12,700 IPS signatures from the security inspection, apparatus 100 may effectively reduce the amount of time and/or computing resources needed to perform the security inspection. As a result, apparatus 100 may achieve improved performance, speed, and/or efficiency without necessarily compromising the accuracy and/or effectiveness of the security inspection.

Figure 3:
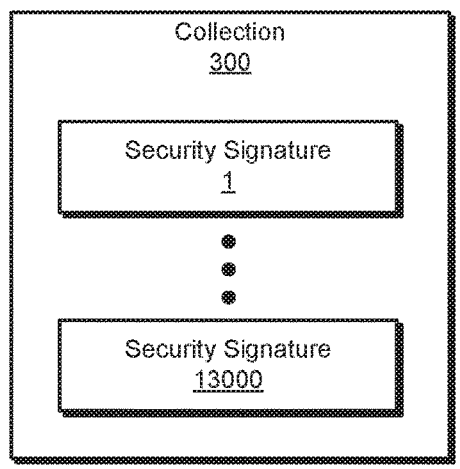
FIG. 3 is a block diagram of an exemplary collection of security signatures and an exemplary subset of security signatures.
Figure 3:
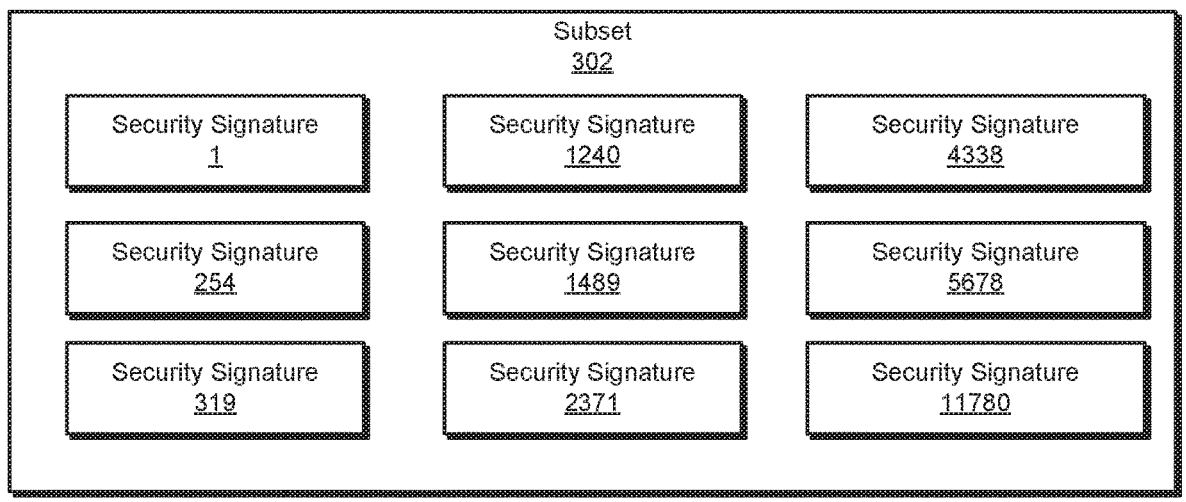

FIG. 3 shows an exemplary collection 300 of security signatures and an exemplary subset 302 of security signatures. As illustrated in FIG. 3, collection 300 may include and/or represent security signatures 1-13000. Accordingly, collection 300 may include and/or represent 13,000 unique and/or different security signatures.

As further illustrated in FIG. 3, subset 302 may include security signatures 1, 254, 319, 1240, 1489, 2371, 4338, 5678, and 11780. Accordingly, subset 302 may include and/or represent only a small fraction of all the security signatures from collection 300. In one example, subset 302 may correspond to a certain security policy and/or be applied to unknown flows that meet certain criteria. In this example, apparatus 100 may apply subset 302 (as opposed to all of collection 300) to those flows that meet the criteria.

By applying subset 302 to those flows in this way, apparatus 100 may reduce the amount of time and/or computing resources needed to perform an appropriate security inspection on those flows. As a result, apparatus 100 may achieve improved performance, speed, and/or efficiency without necessarily compromising the accuracy and/or effectiveness of the security inspection.

Figure 4:
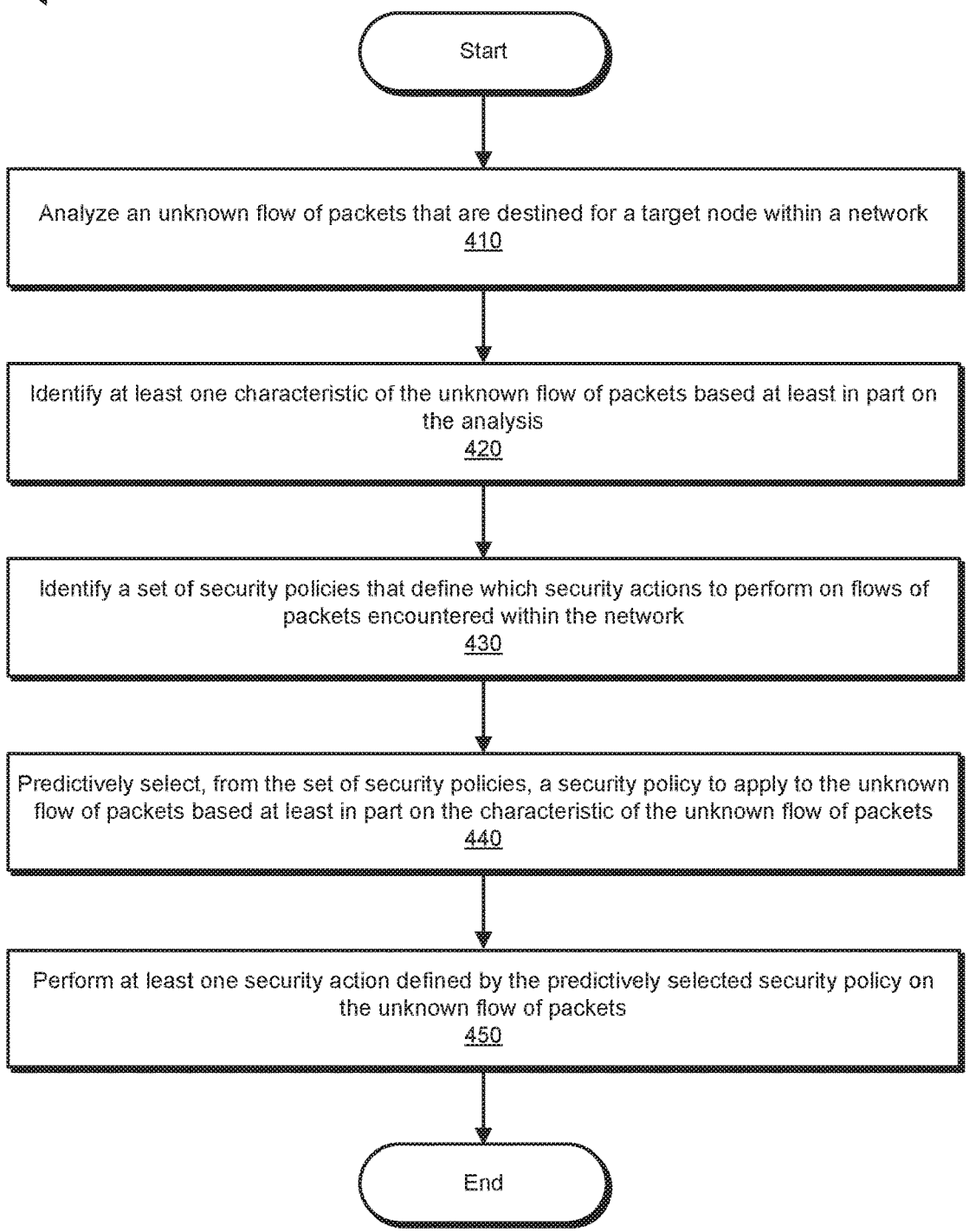
FIG. 4 is a flow diagram of an exemplary method for predictively enforcing security policies on unknown flows.

FIG. 4 is a flow diagram of an exemplary method 400 for predictively enforcing security policies on unknown flows. Method 400 may include the step of analyzing an unknown flow of packets that are destined for a target node within a network (410). This analyzing step may be performed in a variety of ways. In one example, the step may be performed via DPI. For example, apparatus 100 may detect and/or receive an unknown flow of packets from node 202. As the unknown flow of packets arrives, apparatus 100 may analyze the unknown flow by performing DPI on one or more of the packets.

In some examples, method 400 may also include the step of identifying at least one characteristic of the unknown flow of packets based at least in part on the analysis (420). This identifying step may be performed in a variety of ways. In one example, the step may rely on the results of the DPI analysis. For example, during the DPI analysis, apparatus 100 may identify the user who initiated the unknown flow of packets, a history of the user's computing behavior, the source node on which the user initiated the unknown flow of packets, the history of the source node's computing activity, the time of day that the unknown flow of packets was initiated at the source node, the IP address of the target node for which the unknown flow of packets are destined, the type of browser used to initiate the unknown flow of packets, the type of device of the source node, the application used to initiate the unknown flow of packets, and/or the operating system running on the node that initiated the unknown flow of packets.

In some examples, method 400 may further include the step of identifying a set of security policies that define which security actions to perform on flows of packets encountered within the network (430). This identifying step may be performed in a variety of ways. For example, apparatus 100 may identify and/or create security policies 104 stored in storage device 102. In this example, security policies 104 may define which security actions to perform on flows of packets encountered within network 204.

In addition, method 400 may include the step of predictively selecting, from the set of security policies, a security policy to apply to the unknown flow of packets based at least in part on the characteristic of the unknown flow of packets (440). This predictive selecting step may be performed in a variety of ways. For example, apparatus 100 may search security policies 104 for the security policy whose criteria matches and/or corresponds best to the characteristics of the unknown flow of packets. During this search, apparatus 100 may identify the security policy with those characteristics and then apply that security policy to the unknown flow of packets.

Finally, method 400 may include the step of performing at least one security action defined by the predictively selected security policy on the unknown flow of packets (450). This step may be performed in a variety of ways. For example, apparatus 100 may compare the unknown flow of packets against any or all security signatures included in, identified by, and/or implicated by the predictively selected security policy. Additionally or alternatively, apparatus 100 may block, drop, reroute, and/or quarantine the unknown flow of packets.

Figure 5:
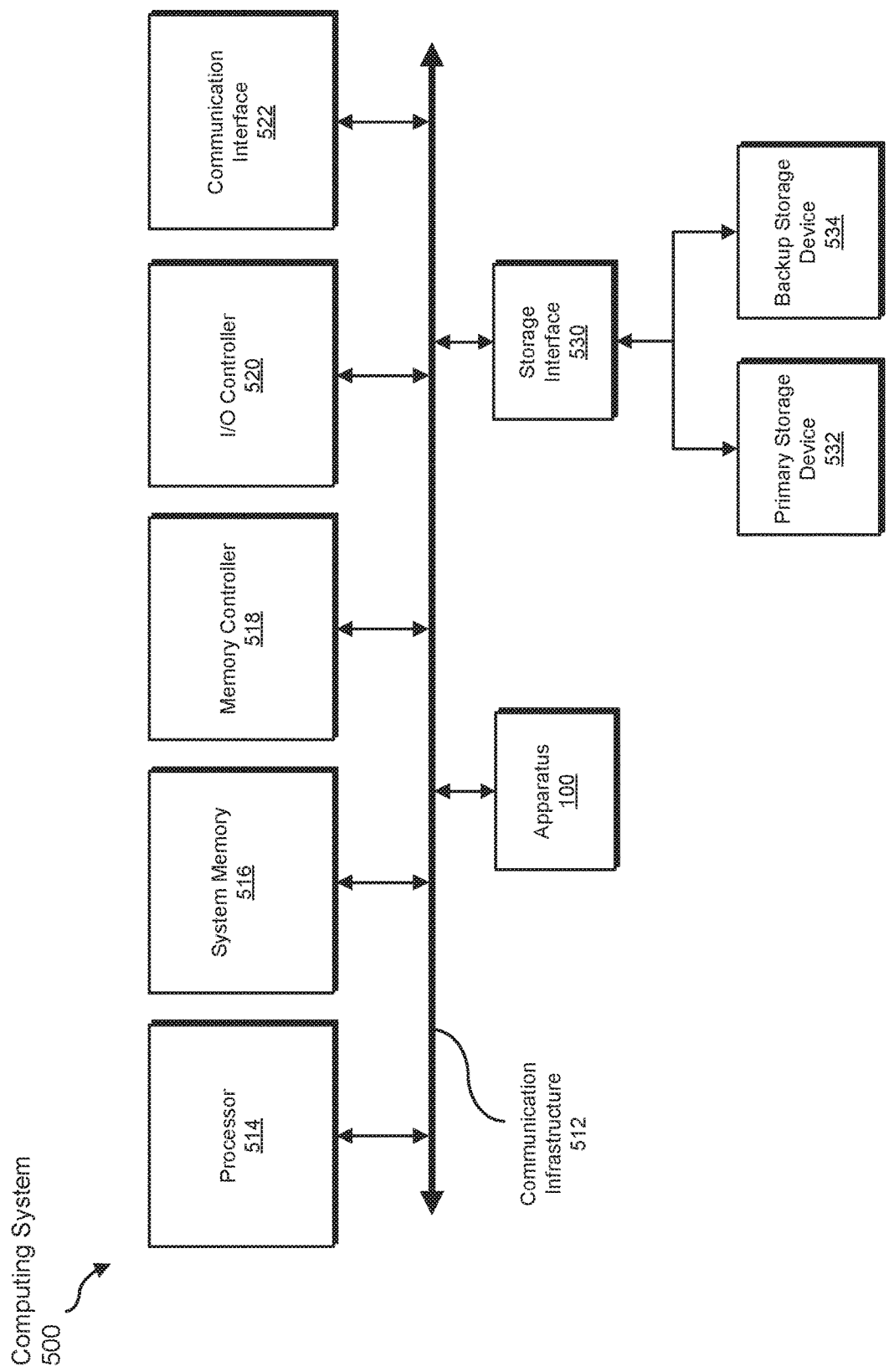
FIG. 5 is a block diagram of an exemplary computing system capable of implementing and/or being used in connection with one or more of the embodiments described and/or illustrated herein.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 5. All or a portion of computing system 500 may also perform and/or be a means for performing and/or implementing any other steps, methods, or processes described and/or illustrated herein. In one example, computing system 500 may include apparatus 100 from FIG. 1.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), load balancers, network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. For example, processor 514 may represent an application-specific integrated circuit (ASIC), a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device. For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing. For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
a storage device that stores a set of security policies that define which security actions to perform on flows of packets encountered within a network; and
a physical processor communicatively coupled to the storage device, wherein the physical processor:
collects information about traffic traversing the network;
builds a security reference based at least in part on the collected information about the traffic traversing the network;
analyzes an unknown flow of packets that originate from a source node and are destined for a target node within the network;
identifies at least one characteristic of the unknown flow of packets based at least in part on the analysis, wherein the characteristic of the unknown flow comprises an indication of a software component running on the source node from which the unknown flow of packets originate;
compares the indication of the software component to the security reference built from the collected information about the traffic traversing the network;
predictively selects, from the set of security policies stored in the storage device, a security policy to apply to the unknown flow of packets based at least in part on the comparison of the indication of the software component to the security reference, wherein predictively selecting the security policy comprises:
identifying a collection of security signatures that facilitate analyzing unknown flows of packets encountered within the network;
selecting a subset of the security signatures to apply to the unknown flow of packets as part of the security policy, wherein the subset of security signatures correspond to the predictively selected security policy; and
omitting multiple security signatures included in the collection from the subset to reduce an amount of resource consumption involved in applying the security policy to the unknown flow of packets, wherein the multiple security signatures do not correspond to the predictively selected security policy; and performs at least one security action defined by the predictively selected security policy on the unknown flow of packets.

2. The apparatus of claim 1, wherein the characteristic of the unknown flow of packets further comprises a further indication of at least one of:
an identity of a user who initiated the unknown flow of packets;
a history of the user's computing behavior;
an identity of the source node on which the user initiated the unknown flow of packets;
a history of the source node's computing activity;
a time of day that the unknown flow of packets is initiated at the source node; and
an Internet Protocol (IP) address of the target node for which the unknown flow of packets are destined.

3. The apparatus of claim 1, wherein the physical processor analyzes the unknown flow of packets by performing Deep Packet Inspection (DPI) on the unknown flow of packets at a network device that encounters the unknown flow of packets within the network.

4. The apparatus of claim 1, wherein the security signatures comprise Intrusion Prevention System (IPS) signatures.

5. The apparatus of claim 1, wherein the security policy applied to the unknown flow of packets comprises at least one of:
an IPS policy;
an Intrusion Detection System (IDS) policy;
a sandbox policy; and
an application firewall policy.

6. The apparatus of claim 1, wherein the security action performed on the unknown flow of packets comprises at least one of:
blocking the unknown flow of packets;
quarantining the unknown flow of packets; and
notifying the target node that the unknown flow of packets has been blocked.

7. The apparatus of claim 1, wherein the physical processor:
determines, based at least in part on the comparison, that the unknown flow of packets presents a low level of risk to the target node; and
in response to the determination, predictively selects a low-security policy to apply to the unknown flow of packets, the low-security policy being less restrictive and more efficient than a high-security policy.

8. The apparatus of claim 1, wherein the physical processor:

determines, based at least in part on the comparison, that
the unknown flow of packets presents a high level of
risk to the target node; and
in response to the determination, predictively selects a
high-security policy to apply to the unknown flow of
packets, the high-security policy being more restrictive
and less efficient than a low-security policy.

9. The apparatus of claim 1, wherein the physical processor predictively selects the security policy to apply to the flow of packets by implementing at least one of:
machine learning on the collected information about the traffic traversing the network;
fuzzy learning on the collected information about the traffic traversing the network; and
neural networks from the collected information about the traffic traversing the network.

10. A network device comprising:
a storage device that stores a set of security policies that define which security actions to perform on flows of packets encountered within a network; and
a physical processor communicatively coupled to the storage device, wherein the physical processor:
collects information about traffic traversing the network;
builds a security reference based at least in part on the collected information about the traffic traversing the network;
analyzes an unknown flow of packets that originate from a source node and are destined for a target node within the network;
identifies at least one characteristic of the unknown flow of packets based at least in part on the analysis, wherein the characteristic of the unknown flow comprises an indication of a software component running on the source node from which the unknown flow of packets originate;
compares the indication of the software component to the security reference built from the collected information about the traffic traversing the network;
predictively selects, from the set of security policies stored in the storage device, a security policy to apply to the unknown flow of packets based at least in part on the comparison of the indication of the software component to the security reference, wherein predictively selecting the security policy comprises:
identifying a collection of security signatures that facilitate analyzing unknown flows of packets encountered within the network;
selecting a subset of the security signatures to apply to the unknown flow of packets as part of the security policy, wherein the subset of security signatures correspond to the predictively selected security policy; and
omitting multiple security signatures included in the collection from the subset to reduce an amount of resource consumption involved in applying the security policy to the unknown flow of packets, wherein the multiple security signatures do not correspond to the predictively selected security policy; and performs at least one security action defined by the predictively selected security policy on the unknown flow of packets.

11. The network device of claim 10, wherein the characteristic of the unknown flow of packets further comprises a further indication of at least one of:
an identity of a user who initiated the unknown flow of packets;
a history of the user's computing behavior;
an identity of the source node on which the user initiated the unknown flow of packets;
a history of the source node's computing activity;
a time of day that the unknown flow of packets is initiated at the source node; and
an Internet Protocol (IP) address of the target node for which the unknown flow of packets are destined.

12. The network device of claim 10, wherein the physical processor analyzes the unknown flow of packets by performing Deep Packet Inspection (DPI) on the unknown flow of packets at the network device that encounters the unknown flow of packets within the network.

13. The network device of claim 10, wherein the security signatures comprise Intrusion Prevention System (IPS) signatures.

14. The network device of claim 10, wherein the security policy applied to the unknown flow of packets comprises at least one of:
an IPS policy;
an Intrusion Detection System (IDS) policy;
a sandbox policy; and
an application firewall policy.

15. A method comprising:
collecting information about traffic traversing a network;
building a security reference based at least in part on the collected information about the traffic traversing the network;
analyzing an unknown flow of packets that originate from a source node and are destined for a target node within the network;
identifying at least one characteristic of the unknown flow of packets based at least in part on the analysis, wherein the characteristic of the unknown flow comprises an indication of a software component running on the source node from which the unknown flow of packets originate;
identifying a set of security policies that define which security actions to perform on flows of packets encountered within the network;
comparing the indication of the software component to the security reference built from the collected information about the traffic traversing the network;
predictively selecting, from the set of security policies, a security policy to apply to the unknown flow of packets based at least in part on the comparison of the indication of the software component to the security reference, wherein predictively selecting the security policy comprises:
identifying a collection of security signatures that facilitate analyzing unknown flows of packets encountered within the network;
selecting a subset of the security signatures to apply to the unknown flow of packets as part of the security policy, wherein the subset of security signatures correspond to the predictively selected security policy; and
omitting multiple security signatures included in the collection from the subset to reduce an amount of resource consumption involved in applying the security policy to the unknown flow of packets, wherein the multiple security signatures do not correspond to the predictively selected security policy; and performing at least one security action defined by the predictively selected security policy on the unknown flow of packets.

\* \* \* \* \*